Oct. 28, 1941.　　　　C. SAUZEDDE　　　　2,260,340
HYDROSTATIC BRAKE
Filed Jan. 18, 1940　　　　2 Sheets-Sheet 1
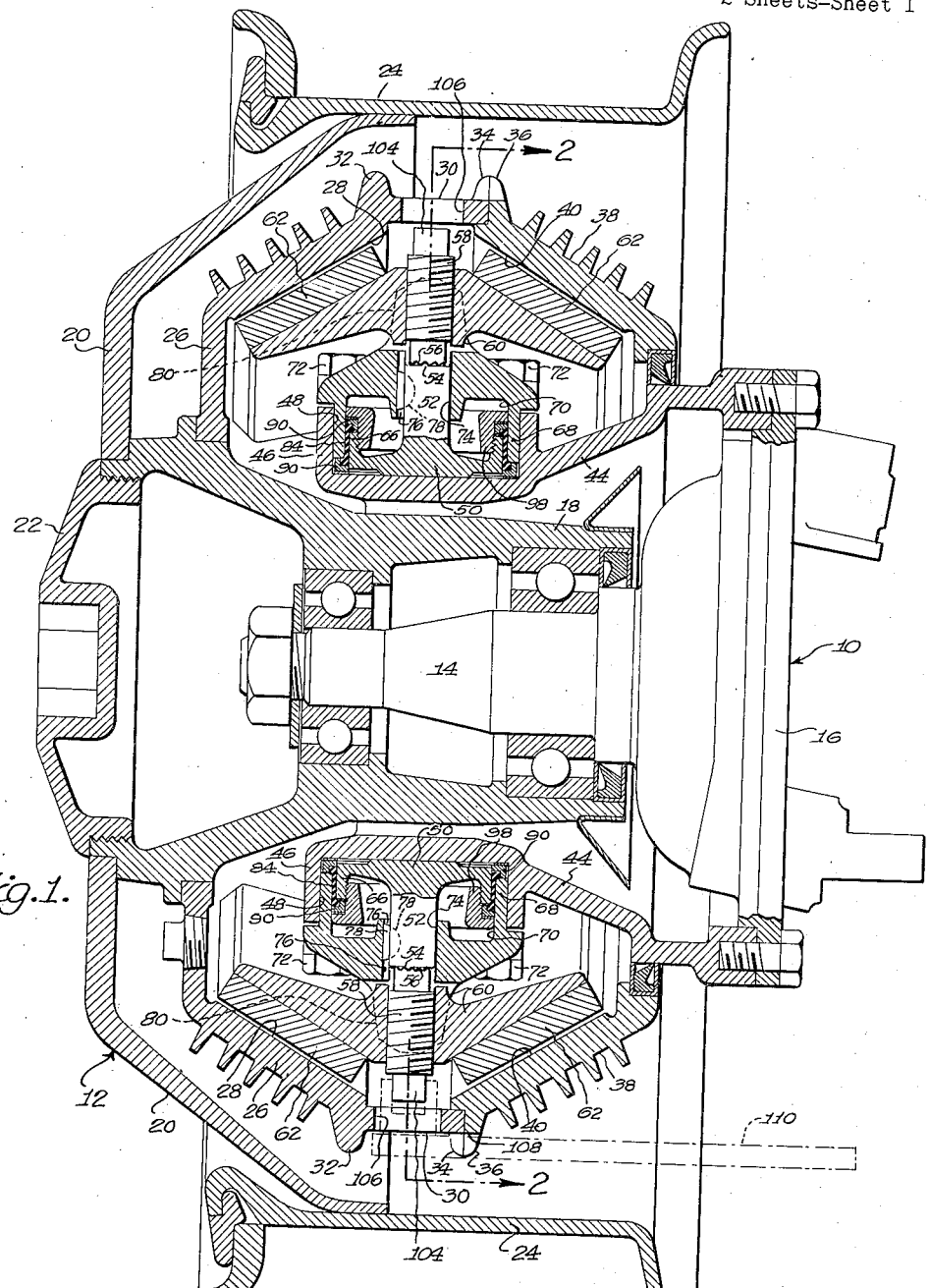
Fig.1.
Fig.4.
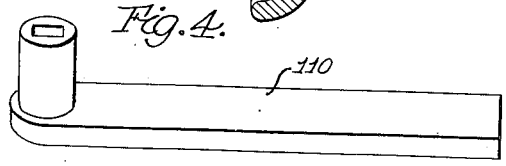
Inventor
Claude Sauzedde
By
Attorneys Oct. 28, 1941.　　　　C. SAUZEDDE　　　　2,260,340
HYDROSTATIC BRAKE
Filed Jan. 18, 1940　　　　2 Sheets-Sheet 2

Inventor
Claude Sauzedde
By
Bartlett & Ough
Attorneys

Patented Oct. 28, 1941

2,260,340

UNITED STATES PATENT OFFICE 2,260,340

HYDROSTATIC BRAKE

Claude Sauzedde, Detroit, Mich., assignor to Detroit Hydrostatic Brake Corporation, Detroit, Mich., a corporation of Michigan Application January 18, 1940, Serial No. 314,500

6 Claims. (Cl. 188—152)

This invention relates, in general, to vehicle brakes of the hydrostatic type and, in particular, to that part of the braking system residing at the wheel.

One of the objects of the present invention is to provide a new and improved vehicle brake of the hydrostatic type which operates with less effort and greater efficiency than heretofore.

Another object is to provide a new and improved vehicle brake which requires adjustments less frequently and which, when adjustments are necessary, may be adjusted more easily, readily and effectively than heretofore.

Another object is to provide in a hydrostatic braking system a new and improved fluid sealing arrangement at the wheel portion of said system which is capable of withstanding higher fluid pressures and which permits the wheel piston to react more strictly in accordance with the actuation of the compression piston than heretofore.

Another object is to provide in a hydrostatic braking system a new and improved arrangement for sealing the braking fluid at the wheel portion of said system which is not only less expensive and more effective than heretofore but which presents an unyielding surface to the pressure created for the braking operation so as to eliminate any power loss whatsoever in the transmission of said pressure beyond said surface.

Other objects and advantages of the invention will become readily apparent from a reference to the following specification taken in conjunction with the accompanying drawings of which there are two (2) sheets and wherein:

Figure 1 is a sectional view through the wheel and brake taken in the direction of the wheel axis and showing the invention incorporated therein;

Fig. 4 is an elevational view of a wrench employed in the adjustment of shoe-drum clearances.

Figure 2:
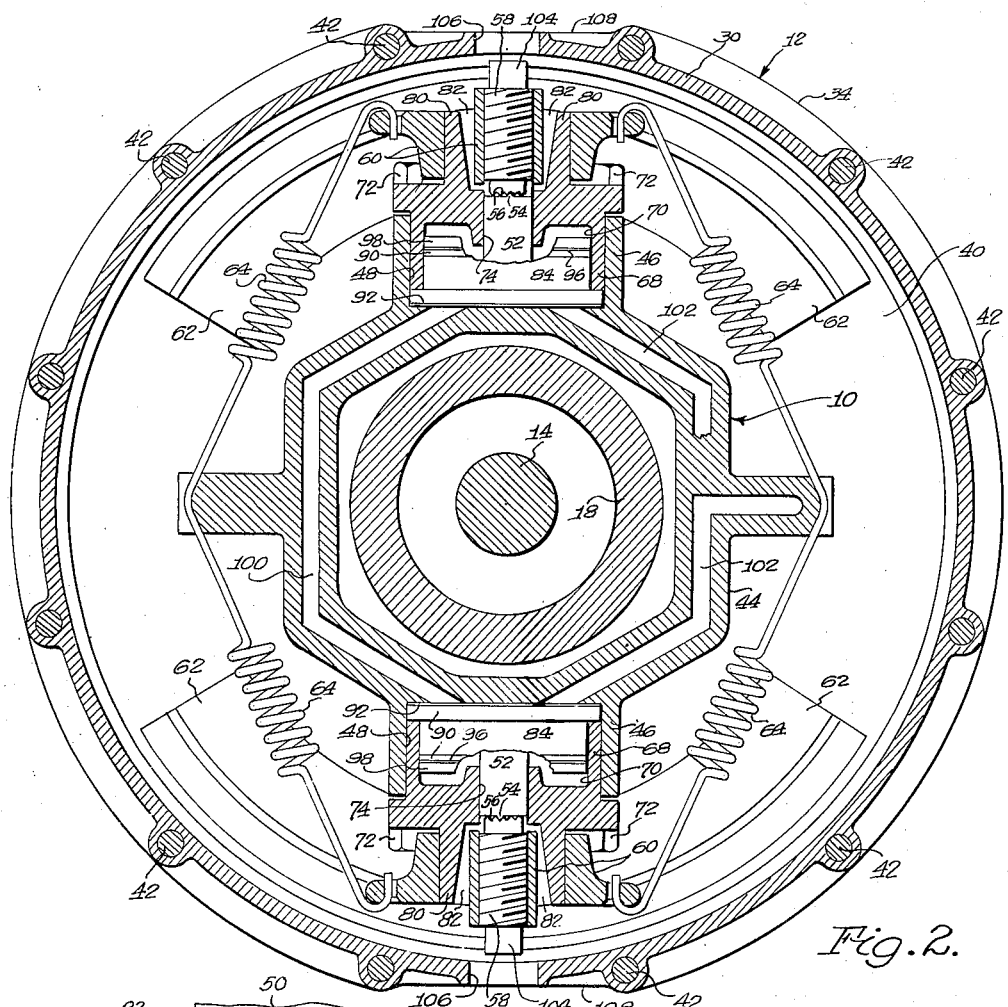
Fig. 2 is a section taken along the lines 2—2 in Fig. 1.

Though the invention is shown herein as being applied to a braking mechanism for the front wheel of a vehicle, to a braking mechanism employing a braking surface of frusto-conical cross section and to a braking mechanism employing two units per wheel, it is to be clearly understood that such mechanism may be made readily and equally as applicable to the rear wheel of the vehicle or to a braking surface having a cross section other than frusto-conical, and it may comprise more or less than two units per wheel. Such variations are contemplated and, it is believed, will reside within the herein inventive scope because they will require, in view of the enlightenment offered by the herein disclosure, the exercise of mere mechanical skill in their employment.

As is usual in any wheel brake structure, the structure shown in the figures comprises a non-rotatable section, generally indicated at 10, and a rotatable section, generally indicated at 12. The brake itself and its support constitute, as is usual, part of the non-rotatable section 10, and, since it has been optionally chosen to illustrate the particular adaptation of the structure 10—12 to one of the front wheels of a vehicle, as distinguished from a rear wheel thereof, the support for the wheel also constitutes part of said section 10.

The non-rotatable section 10 of the wheel brake structure 10—12 comprises, in part, an axle 14 which is integral, as usual, with the wheel supporting portion 16 of the steering mechanism (not shown completely) so as to respond in accordance with the operator's manipulation of said mechanism to direct the course of the vehicle.

The rotatable section 12 of the wheel brake structure 10—12 comprises, in part, a sectionally constructed hub consisting of an inner, cylindrical portion 18 and an outer, radially outwardly extending portion 20, said portion 20 being annular and carried by the outer end of said portion 18 for rotation therewith as well, preferably, as for selective separation therefrom to enable tire changing, inspection, etc., without the necessity of removing both of said portions unitarily. The hub portion 18 is concentrically carried about the axle 14, through the use of suitable bearings and thrust members, for rotation relatively thereto without axial movement therealong, and to the outer end of said portion there is removably secured a hub cap 22. On the other hand, the hub portion 20 integrally carries at its periphery an annular tire carrying rim 24 (the tire not being shown) for rotation with the unit 18—20—22 about the axis of the axle 14.

Referring again to the hub portion 18, said portion has fixed thereto, either removably or permanently and for rotation therewith, an annular drum 26 which resides within the space defined by the hub portion 20 and extends outwardly from said portion 18 in successively radial and diagonal directions to provide therewithin, with respect to the axis of rotation of said drum, a frusto-conical braking surface 28. The outer end of the diagonal section of the drum 26 has integral therewith a relatively short cylindrical section 30, there being provided an annular, radially extending flange 32 between said diagonal and cylindrical sections and another such flange 34 provided at the opposite end of said section 30. Cooperable with the flange 34 is the annularly flanged end 36 of another annular drum 38 which provides, with respect to the axis of rotation of the rotatable section 12 of the wheel brake structure, another frusto-conical braking surface 40, said drum 38 and the drum 26 being secured together for unitary rotation by means of a plurality of annularly spaced bolts or rivets 42 passing through and interconnecting the flanged portions 32, 34 and 36 of said drums. The end of the drum 38 opposite its bolted end is absolutely free so that the rotatable unit 12, which consists in the main of the integrated elements 18, 26 and 38, together with the stationary or non-rotatable unit 10, which consists in the main of the integrated elements 14, 16, the brake itself and its support (the latter two of which are to be described), comprise a wheel brake structure of the semi-floating type, a type which is at present in use. It is seen in Fig. 1 particularly that the rotatable drums 26 and 38 comprise a single brake drum unit and that their braking surfaces 28 and 40 comprise a single braking surface of frusto-conical cross section, but it is to be remembered that such a showing is purely illustrative, same being well adapted for modification without departing, as will subsequently be seen, from the spirit or scope of the invention.

Returning to the description of the non-rotatable section 10 of the wheel brake structure 10—12, it will be noted, especially in Fig. 1, that the support 16 which carries the non-rotatable axle 14 also fixedly and non-rotatably carries an annular spider or support 44 which extends from said support 16 through the free end of the rotatable drum 38 and telescopically about said axle into confinement within the space or chamber defined between said axle and the braking surfaces 28 and 40. The spider 44 is integrally formed with a pair of diametrically spaced, cylinder-forming portions 46 the axes of the cylinders 48 of which are co-aligned, normal to the axis of wheel rotation (the axis of axle 14) and symmetrical with respect to or centrally of the braking surfaces 28 and 40. Each of the cylinders 48 is closed at its inner radial end by means of the spider 44 itself and each carries, for reciprocation therein and relatively thereto, a piston 50 the head of which is cooperable with the portion of said spider closing said cylinder end when said piston is in retracted position. Each of the pistons 50 is integrally provided with a stem 52 which projects outwardly of the respective cylinder 48 and is knurled, serrated or notched, as at 54, at its outer end so as to cooperate with a complementarily knurled, serrated or notched end 56 of a threaded stem 58 which is threadedly carried in a threaded opening provided therefor in a bridge member 60 on the underside of a brake shoe unit 62 for integrating the two frusto-conically arranged shoes thereof. The two shoes of each unit 62 are arcuate and the stem 58 which is adjustably connected to the respective bridge member 60 thereof is centered with respect to the latter as well as to said shoes so that any force exerted on the respective unit 62 through the respective unit 50—52—58 will be distributed equally over the braking surfaces of said shoes and, resultantly, over the braking surfaces 28 and 40 of the drums 26 and 38.

The radially movable units 50—52—58—60—62 (each of which is separably interconnected at 54—56) are held in normally retracted position by means of a pair of springs 64 which resiliently interconnect said units and oppose their protraction.

The head of each of the pistons 50 is integrally formed with an annular skirt 66 which extends concentrically with respect to and in the direction of its respective stem 52. Arranged between the outer cylindrical wall of each of the skirts 66 and the wall of the respective cylinder 48, in tightly fitting engagement with the latter, is a cylinder-forming member 68 the formed cylinder 70 of which is slightly greater in diameter than the outer diameter of said respective skirt, each of said members 68 being stationarily secured in place in its respective cylinder 48 by means of bolts 72 threadedly lodged in the spider 44. For reasons which will presently appear, the inner end of each of the members 68, when said member is in fixed position with respect to the spider 44, is slightly spaced from that portion of said spider which provides the base of the concentric cylinders 48 and 70.

Each of the stationary members 68, in addition to providing the cylinder 70, is formed at its outer end to close said cylinder, there being provided, however, an opening 74 through said end in which is freely received the respective stem 52 and part of the abutting stem 58, the part of said stem 58 received in said opening 74 being reduced in diameter and preferably un-threaded so as to enable the unit 62—60—58 to move in the direction of the axis of wheel rotation (for self-alignment of the shoes with respect to their drums) relatively to the non-axially movable unit 68—52—50 along the respective surface 54—56. For enabling unitary, radial movement of each of the units 62—60—58—52—50 relatively to the respective member 68 and without rotation, the wall of each of the openings 74 is formed with a keyway 76 extending in the direction of the axis of said opening and receiving a key 78 integrally formed on the periphery of the respective stem 52.

The outer end of each of the cylinder-forming cap members 68 is integrally provided with a pair of prongs 80 which are arranged on opposite sides of the opening in the respective bridge member 60 receiving the stem 58 and extend into openings 82 provided therefor in said member, said prongs cooperating with said openings 82 to permit the aforementioned axial movement of the respective unit 62—60—58 relatively to the respective unit 68—52—50 but to prevent any movement of either of said units in a direction normal to said axial direction, that is, in the direction of wheel rotation.

Figure 3:
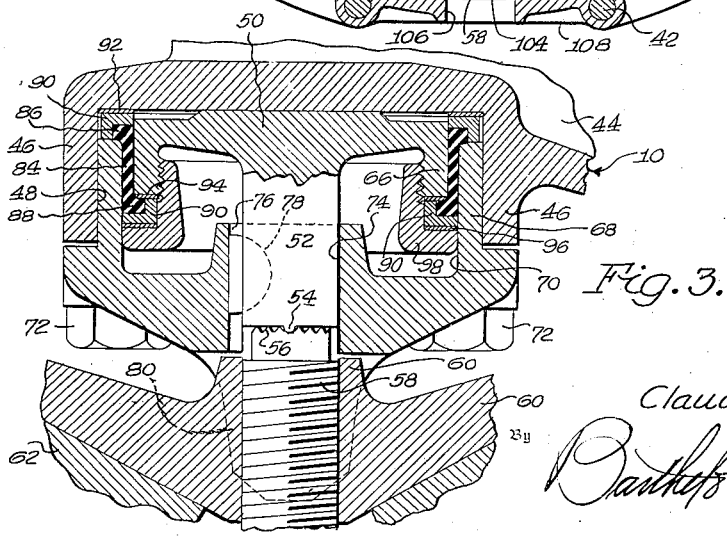
Fig. 3 is an enlarged detail of one of the wheel cylinder units shown in Fig. 1.

Referring to the enlarged view in Fig. 3, it will be noted that the elongated space of annular cross section existing between the outer cylindrical wall of the piston skirt 66 and the innner cylindrical wall of the cap member 68 is filled with an elastic, cylindrical member 84 the extremity of which adjacent the base of the cylinder 48 being outwardly flanged, as at 86, and the opposite extremity of which being inwardly flanged, as at 88, said flange 86 overlying the inner end of said cap member and said flange 88 overlying the end of said skirt. Bonderized or otherwise cemented to the end and side walls of the flange 86 is a flanged, annular, metallic reenforcing ring 90, the end and side walls of the other flange 88 also having similarly secured thereto another such ring 90. In assembly, a metallic, annular gasket 92, such as aluminum or other relatively soft material, having an outer diameter substantially similar to the diameter of the cylinder 48, is placed on the base of said cylinder and the unit 90—84—90 is then arranged over the skirt 66, there being provided, if desired, another gasket 94, similar to said gasket 92 except for its outer diameter being substantially similar to the outer diameter of said skirt rather than to that of said gasket 92, between the end of said skirt and the adjacent ends of the ring 90 and flange 88. Another gasket 96, similar to the gaskets 92 and 94 except for its outer diameter being substantially similar to the diameter of the cylinder 70 rather than to that of said gasket 92 or to that of said gasket 94, is placed over the end of the ring 90 opposite the end carrying said gasket 94, and an annular, externally threaded, outwardly flanged nut 98 is then screwed into the threaded, inner wall of the skirt 66 and securely tightened against said gasket 96 for unifying the elements 50—66, 84—90, 94, 96 and 98. Finally, the cap member 68 is inserted between the cylinder wall 48 and the outer wall of the elastic member 84 and tightened in place by means of the bolts 72, it being seen that the inner end of said member 68 abuts the ring 90 and flange 86 and unifies the elements 44, 92, 84—90 and 68.

Referring to Fig. 2, the pistons 50 at each wheel are intercommunicated by means of fluid passageways 100 and 102 formed in the spider 44 the latter of which passageways is in communication with the manually operated compressor (not shown) in the fluid system whereby said pistons are protracted simultaneously upon the actuation of said compressor and retract by the springs 64 while said compressor is at rest. When the fluid system compressor is actuated, fluid under pressure enters each of the cylinders 48 and reacts upon the piston 50 therewithin, said fluid being confined behind said piston by means of the sealing unit 92—90—84—90—96 or the unit 92—90—84—90—96—94. Protraction of the piston 50, to interengage the shoes and drums, elongates the elastic member 84, the flanged end 86 remaining stationary and the flanged end 88 moving with said piston. This sealing unit at each wheel cylinder assembly is leak-proof because there are little or no stresses applied to any of its elements so that extremely high fluid pressures may be employed in braking. The fluid pressure is reactive in its entirety upon the metallic faces of the pistons 50 so that all is expended in protracting said pistons rather than having some spent, as has been customary, in the "give" of, say, a rubber wall lying over each of said faces in the path of said fluid. The construction and assembly of the elements of the sealing unit are obviously simple.

Referring lastly to the adjustability of the clearances between the shoes and their drums, the outer end 104 of each of the stems 58 extends beyond the respective supporting member 60, between the two shoes of the respective unit 62, and is formed thereat with a polygonal cross section. The cylindrical section 30 of the drum 26 is formed with a plurality of spaced openings 106 which, at certain positions of said drum, register with the stem ends 104 for providing access to the latter. In the vicinity of each of the openings 106 the ribs or flanges 34 and 36 are flattened, as at 108, so that a wrench 110 may be inserted over either of the stem ends 104 from the inner side of the wheel and turned so as to move the respective shoe unit 62 toward or away from the braking surface 28—40. The knurled end 56 of the stem 58 being adjusted rides over the knurled end 54 of the non-rotatable stem 52, the unit 62—60 moves along said stem 58 in the direction intended by the turning of the wrench 110, and said knurled ends after the adjustment serve to prevent inadvertent turning of said stem 58.

Although the invention has been described with some detail it is not intended that such description be definitive of the limits of the inventive idea. The right is reserved to make such changes in the details of construction and arrangement of parts as will fall within the purview of the attached claims.

I claim.

1. In a hydrostatic braking mechanism having a rotatable brake drum and a non-rotatable braking member for and cooperable with the drum and comprising, a non-rotatable support defining a cylinder in communication with a source of fluid pressure, a piston reciprocably mounted in said cylinder and operatively connected to the braking member for unitary movement therewith responsive to said pressure, a cylindrical member of flexible material arranged between said piston and the wall of said cylinder and having its two ends radially flanged in opposite directions, an annular reenforcing member permanently fixed to each of said flanged ends of said flexible member, means arranged between said flexible member and said cylinder wall and cooperable with one of said reenforcing members for stationarily sealing the respective end of said flexible member to the base of said cylinder, and means cooperable with the other of said reenforcing members for sealing the respective end of said flexible member to said piston for movement therewith.

2. In a hydrostatic braking mechanism having a rotatable brake drum and a non-rotatable braking member for and cooperable with the drum and comprising, a non-rotatable support defining a cylinder in communication with a source of fluid pressure, a piston reciprocably mounted in said cylinder and operatively connected to the braking member for unitary movement therewith responsive to said pressure, a cylindrical member of flexible material arranged between said piston and the wall of said cylinder and having its two ends radially flanged in opposite directions, an annular reenforcing member permanently fixed to each of said flanged ends of said flexible member, means arranged between said flexible member and said cylinder wall and cooperable with one of said reenforcing members for stationarily sealing the respective end of said flexible member to the base of said cylinder, means cooperable with the other of said reenforcing members for sealing the respective end of said flexible member to said piston for movement therewith, an annular gasket arranged between said cylinder base and the reenforcing member thereat, and another annular gasket arranged between said second mentioned means and the reenforcing member thereat.

3. In a hydrostatic braking mechanism having a rotatable brake drum and a non-rotatable braking member for and cooperable with the drum and comprising, a stationary support defining a cylinder in communication with a source of fluid pressure, a piston mounted in said cylinder for reciprocation relatively thereto and operatively connected to the braking member for unitarily moving the latter therewith in response to said pressure, said piston being integrally formed with an annular skirt portion extending in concentric and parallel relationship with respect to the wall of said cylinder, a stationary guide member for the braking member and having an annular extension protruding into position between said cylinder wall and the outer wall of said skirt portion, an annular clamping member fixedly secured to the inner wall of said skirt portion for movement therewith and overlying the end thereof, and a flexible, cylindrical sealing member arranged between the inner wall of said extension and said outer wall of said skirt portion and having one of its ends fixedly sealed between the base of said cylinder and the end of said extension and the other of its ends fixedly sealed between said clamping member and said end of said skirt portion.

4. In a hydrostatic braking mechanism having a rotatable brake drum and a non-rotatable braking member for and cooperable with the drum and comprising, a stationary support defining a cylinder in communication with a source of fluid pressure, a piston mounted in said cylinder for reciprocation relatively thereto and operatively connected to the braking member for unitarily moving the latter therewith in response to said pressure, said piston being integrally formed with an annular skirt portion extending in concentric and parallel relationship with respect to the wall of said cylinder, a stationary guide member for the braking member and having an annular extension protruding into position between said cylinder wall and the outer wall of said skirt portion, an annular clamping member fixedly secured to the inner wall of said skirt portion for movement therewith and overlying the end thereof, a flexible, cylindrical sealing member arranged between the inner wall of said extension and said outer wall of said skirt portion and having its ends flanged in opposite directions so that one of said flanged ends resides between the base of said cylinder and the end of said extension and the other of said flanged ends resides between said clamping member and said end of said skirt portion, and an annular, metallic reenforcing member secured to each of said flanged ends for providing inflexible spacing means between said cylinder base and said extension end and between said clamping member and said skirt portion end.

5. In a hydrostatic braking mechanism having a rotatable brake drum and a non-rotatable braking member for and cooperable with the drum and comprising, a stationary support defining a cylinder in communication with a source of fluid pressure, a piston mounted in said cylinder for reciprocation relatively thereto and operatively connected to the braking member for unitarily moving the latter therewith in response to said pressure, said piston being integrally formed with an annular skirt portion extending in concentric and parallel relationship with respect to the wall of said cylinder, a stationary guide member for the braking member and having an annular extension protruding into position between said cylinder wall and the outer wall of said skirt portion, an annular clamping member fixedly secured to the inner wall of said skirt portion for movement therewith and overlying the end thereof, a flexible, cylindrical sealing member arranged between the inner wall of said extension and said outer wall of said skirt portion and having one of its ends fixedly sealed between the base of said cylinder and the end of said extension and the other of its ends fixedly sealed between said clamping member and said end of said skirt portion, and a pair of annular gaskets arranged one between said cylinder base and the respective end of said sealing member and the other between said clamping member and the respective end of said sealing member.

6. In a hydrostatic braking mechanism having a rotatable brake drum and a non-rotatable braking member for and cooperable with the drum and comprising, a stationary support defining a cylinder in communication with a source of fluid pressure, a piston mounted in said cylinder for reciprocation relatively thereto and operatively connected to the braking member for unitarily moving the latter therewith in response to said pressure, said piston being integrally formed with an annular skirt portion extending in concentric and parallel relationship with respect to the wall of said cylinder, a stationary guide member for the braking member and having an annular extension protruding into position between said cylinder wall and the outer wall of said skirt portion, an annular clamping member fixedly secured to the inner wall of said skirt portion for movement therewith and overlying the end thereof, a flexible, cylindrical sealing member arranged between the inner wall of said extension and said outer wall of said skirt portion and having its ends flanged in opposite directions so that one of said flanged ends resides between the base of said cylinder and the end of said extension and the other of said flanged ends resides between said clamping member and said end of said skirt portion, an annular, metallic reenforcing member secured to each of said flanged ends for providing inflexible spacing means between said cylinder base and said extension end and between said clamping member and said skirt portion end, and a pair of annular gaskets arranged one between said cylinder base and one of said reenforcing members and the other between said clamping member and the other of said reenforcing members.

CLAUDE SAUZEDDE.